(12) United States Patent
Koda et al.

(10) Patent No.: US 12,337,618 B2
(45) Date of Patent: Jun. 24, 2025

(54) PNEUMATIC TIRE

(71) Applicant: The Yokohama Rubber Co., LTD., Tokyo (JP)

(72) Inventors: Hiraku Koda, Kanagawa (JP); Ryohei Takemori, Kanagawa (JP); Yuki Sasaya, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 644 days.

(21) Appl. No.: 17/595,816

(22) PCT Filed: May 12, 2020

(86) PCT No.: PCT/JP2020/019023
§ 371 (c)(1),
(2) Date: Nov. 24, 2021

(87) PCT Pub. No.: WO2020/246204
PCT Pub. Date: Dec. 10, 2020

(65) Prior Publication Data
US 2022/0161606 A1 May 26, 2022

(30) Foreign Application Priority Data
Jun. 4, 2019 (JP) ................................. 2019-104525

(51) Int. Cl.
*B60C 11/12* (2006.01)
*B60C 11/03* (2006.01)
*B60C 11/13* (2006.01)

(52) U.S. Cl.
CPC ........ *B60C 11/1259* (2013.01); *B60C 11/032* (2013.01); *B60C 11/1204* (2013.01);
(Continued)

(58) Field of Classification Search
CPC ............... B60C 11/032; B60C 11/1204; B60C 11/1236; B60C 2011/0381
See application file for complete search history.

(56) References Cited

U.S. PATENT DOCUMENTS 6,035,911 A * 3/2000 Matsumoto ............. C08L 21/00
526/248
2009/0008017 A1* 1/2009 Kawai .................... B60C 9/2009
152/526
(Continued)

FOREIGN PATENT DOCUMENTS

GB         546975 A   *  8/1942
JP    58-177703 A   * 10/1983
(Continued)

OTHER PUBLICATIONS

Machine translation for Japan 2015-036262 (Year: 2024).*
(Continued)

*Primary Examiner* — Steven D Maki
(74) *Attorney, Agent, or Firm* — Thorpe North & Western (57) ABSTRACT

Provided is a pneumatic tire with wet steering stability performance and dry steering stability performance enhanced in a well-balanced manner.
A dimple group is composed of a plurality of dimples (100 to 104) disposed at intervals and aligned in a tire circumferential direction. When the minimum center-to-center distance between different dimples (100, 102) in an identical dimple group is defined as K and the minimum center-to-center distance between dimples (104, 100) in different dimple groups is defined as L, the ratio L/K is 3.5 or more and 10.0 or less and the minimum center-to-center distance L is 20 mm or more and equal to or less than a ground contact length.

15 Claims, 4 Drawing Sheets

(52) U.S. Cl.
CPC ... *B60C 11/1236* (2013.01); *B60C 2011/0381* (2013.01); *B60C 2011/1286* (2013.01); *B60C 2011/129* (2013.01)

(56) References Cited

U.S. PATENT DOCUMENTS

| | | | |
|---|---|---|---|
| 2010/0236680 A1* | 9/2010 | Mukai | B60C 11/032 152/209.16 |
| 2014/0238566 A1 | 8/2014 | Takahashi | |
| 2017/0036489 A1* | 2/2017 | Fujita | B60C 11/032 |
| 2018/0354303 A1 | 12/2018 | Kiwaki | |

FOREIGN PATENT DOCUMENTS

| | | | |
|---|---|---|---|
| JP | 03-090317 A | * | 4/1991 |
| JP | 04-085108 A | * | 3/1992 |
| JP | 2009-078654 A | * | 4/2009 |
| JP | 2009-292379 A | | 12/2009 |
| JP | 4589704 B2 | | 12/2010 |
| JP | 2013-103675 A | | 5/2013 |
| JP | 2015-036262 A | * | 2/2015 |
| JP | 2018-1798 A | | 1/2018 |
| KR | 10-2007-0053964 A | | 5/2007 |

OTHER PUBLICATIONS

Machine translation for Japan 2009-078654 (Year: 2024).*
Machine translation for Japan 04-085108 (Year: 2024).*
Machine translation for Japan 03-090317 (Year: 2024).*
Machine translation for Japan 58-177703 (Year: 2024).*

* cited by examiner

PNEUMATIC TIRE

TECHNICAL FIELD

The present technology relates to a pneumatic tire with wet steering stability performance and dry steering stability performance enhanced in a well-balanced manner.

BACKGROUND ART

In tread pattern development, wet steering stability performance and dry steering stability performance are required to be provided in a compatible manner. Thus, for enhancement of both of these performances, technology is proposed in which a plurality of dimples (hole group) is formed in a tire tread.

For example, a pneumatic tire including at least one hole group including three or more holes in the surface of a land portion provided in a tread portion has been described (Japan Patent No. 4589704). In the pneumatic tire, for two arbitrary holes i and j in the hole group, when the radius of the circumscribing circle Ci of the hole i is defined as ri, the radius of the circumscribing circle Cj of the hole j is defined as rj, and the center-to-center distance between the circumscribing circles Ci and Cj is defined as dij in a plan view, with respect to every hole i, at least one hole j, which satisfies dij≤(ri+rj)×2 and has a different depth, is included in the hole group to which the hole i belongs, and with respect to at least one hole i, at least two holes j, which satisfy dij≤(ri+rj)×2 and have a different depth, is included in the hole group to which the hole i belongs. According to the pneumatic tire described above, on-snow performance (wet performance) and dry performance are sufficiently achieved in a compatible manner.

SUMMARY

In recent years, it has been required to establish compatibility between wet steering stability performance and dry steering stability performance at a higher level. And thus, there is room to improve an arrangement of dimples for the technology to form dimples in a tread portion.

The present technology provides a pneumatic tire with wet steering stability performance and dry steering stability performance enhanced in a well-balanced manner.

In a pneumatic tire according to an embodiment of the present technology, a plurality of dimple groups is formed in a tread surface. The dimple groups are composed of a plurality of dimples disposed at intervals and aligned in a tire circumferential direction. When the minimum center-to-center distance between different dimples in an identical dimple group is K and the minimum center-to-center distance between dimples in different dimple groups is L, a ratio L/K is 3.5 or more and 10.0 or less and the minimum center-to-center distance L is 20 mm or more and equal to or less than a ground contact length.

In a pneumatic tire according to an embodiment of the present technology, the positional relationship between dimples constituting dimple groups is improved. As a result, the pneumatic tire according to an embodiment of the present technology can enhance wet steering stability performance and dry steering stability performance in a well-balanced manner.

DETAILED DESCRIPTION

Pneumatic tires according to the embodiments of the present technology (Basic Embodiment and Additional Embodiments 1 to 15 described later) will be described in detail below with reference to the drawings. Note that the present technology is not limited to these embodiments. Constituents of the embodiments include components that are substantially identical or that can be substituted or easily conceived by one skilled in the art. In addition, various modes included in the embodiments can be combined as desired within the scope of obviousness by one skilled in the art.

Basic Embodiment

The Basic Embodiment of the pneumatic tire according to an embodiment of the present technology will be described below. Herein, "tire radial direction" refers to the direction orthogonal to the rotation axis of the pneumatic tire, "inner side in the tire radial direction" refers to a side toward the rotation axis in the tire radial direction, and "outer side in the tire radial direction" refers to a side away from the rotation axis in the tire radial direction. In addition, "tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane" refers to the plane orthogonal to the rotation axis of the pneumatic tire, the plane passing through the center of the tire width of the pneumatic tire.

Figure 1:
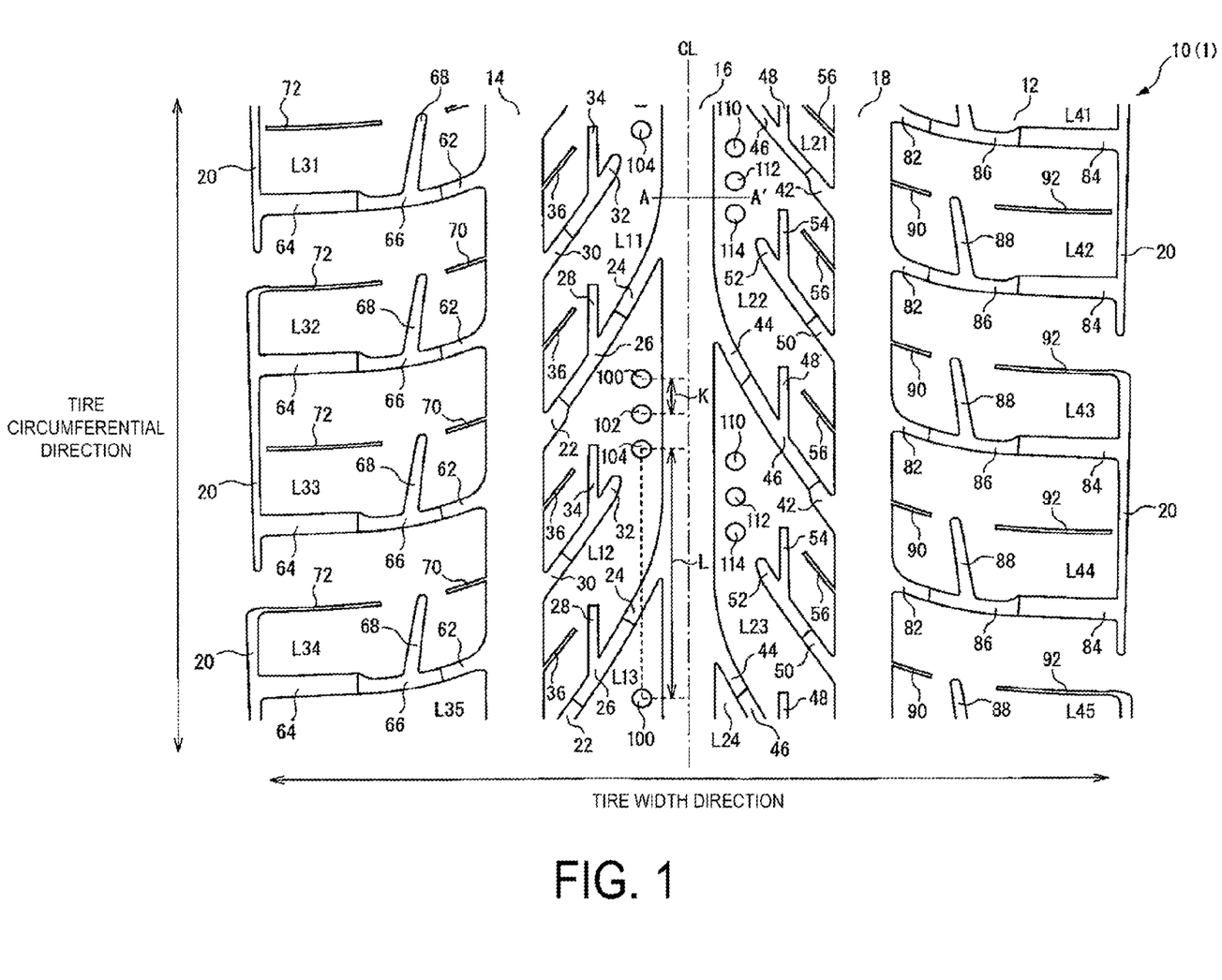
FIG. 1 is a plan view illustrating a pneumatic tire according to an embodiment of the present technology.

FIG. 1 is a plan view illustrating a pneumatic tire according to an embodiment of the present technology. The pneumatic tire 1 illustrated in the same drawing includes a tread portion 10. The tread portion 10 is made of a rubber material (tread rubber) and is exposed on the outermost side of the pneumatic tire 1 in the tire radial direction, with the surface thereof constituting the contour of the pneumatic tire 1. The surface of the tread portion is formed as a tread surface 12, corresponding to a surface that comes into contact with the road surface when a vehicle (not illustrated) mounting the pneumatic tire 1 is traveling.

As illustrated in FIG. 1, in the tread surface 12, circumferential main grooves 14, 16 and 18 which extend continuously in the tire circumferential direction, and circumferential subsidiary grooves 20 and 20 which extend intermittently in the tire circumferential direction in pairs with respect to the tire equatorial plane CL are provided, and land portion rows L1 (including land portions L11 to L13 in FIG. 1), L2 (including land portions L21 to L24 in FIG. 1), L3 (including land portions L31 to L35 in FIG. 1) and L4 (including land portions L41 to L45 in FIG. 1), each of which consists of a plurality of land portions arranged in the tire circumferential direction between two out of the above-mentioned grooves 14 to 20, are defined and formed. In the present embodiment, "main groove" refers to a groove in which a wear indicator is formed.

As representative examples of the land portions constituting the land portion rows L1 to L4, the land portions L12, L22, L32, and L42 will be described below.

The land portion L12 is defined and formed by providing an inclined groove 22 which extends from the circumferential main groove 14 with an inclination with respect to the tire width direction, an inclined groove 24 which extends from the circumferential main groove 16 with an inclination with respect to the tire width direction, and a main sipe 26 which bridges between the inclined grooves 22 and 24, at equal intervals in the tire circumferential direction. A branch sipe 28 extends from the main sipe 26 on one side in the tire circumferential direction and terminates within the land portion L12. In the present embodiment, "sipe" refers to a groove having a width of 1.5 mm or less on a tire surface, and this width does not include the width of a chamfered portion described below.

An inclined groove 30 which extends from the circumferential main groove 14 with an inclination with respect to the tire width direction is provided alternately with the inclined groove 22 in the tire circumferential direction. A main sipe 32 extends on an inner side in the tire width direction of the inclined groove 30 and terminates within the land portion L12. A branch sipe 34 extends from the main sipe 32 on one side in the tire circumferential direction and terminates within the land portion L12.

Moreover, an inclined groove 36 which extends from the circumferential main groove 14 with an inclination with respect to the tire width direction and terminates within the land portion L12 is provided between the inclined grooves 22 and the inclined grooves 30 at regular intervals in the tire circumferential direction. Note that the land portions L11, L13 and the like constituting the land portion row L1 have the same configuration as the land portion L12 described above.

The land portion L22 is defined and formed by providing an inclined groove 42 which extends from the circumferential main groove 18 with an inclination with respect to the tire width direction, an inclined groove 44 which extends from the circumferential main groove 16 with an inclination with respect to the tire width direction, and a main sipe 46 which bridges between the inclined grooves 42 and 44, at equal intervals in the tire circumferential direction. A branch sipe 48 extends from the main sipe 46 on one side in the tire circumferential direction and terminates within the land portion L22.

An inclined groove 50 which extends from the circumferential main groove 18 with an inclination with respect to the tire width direction is provided alternately with the inclined groove 42 in the tire circumferential direction. A main sipe 52 extends on an inner side in the tire width direction of the inclined groove 50 and terminates within the land portion L22. A branch sipe 54 extends from the main sipe 52 on one side in the tire circumferential direction and terminates within the land portion L22.

Moreover, an inclined groove 56 which extends from the circumferential main groove 18 with an inclination with respect to the tire width direction and terminates within the land portion L22 is provided between the inclined grooves 42 and the inclined grooves 50 at regular intervals in the tire circumferential direction. Note that the land portions L21, L23, L24 and the like constituting the land portion row L2 have the configuration identical to the land portion L22 described above.

The land portion L32 is defined and formed by providing a lug groove 62 which extends from the circumferential main groove 14 in a substantially tire width direction, a lug groove 64 which extends from the circumferential subsidiary groove 20 in a substantially tire width direction, and a main sipe 66 which bridges between the lug grooves 62 and 64, at equal intervals in the tire circumferential direction. A branch sipe 68 extends from the main sipe 66 on one side in the tire circumferential direction and terminates within the land portion L32.

Moreover, a lug groove 70 which extends from the circumferential main groove 14 in a substantially tire width direction and terminates within the land portion L32 is provided between the lug grooves 62 and 62 at regular intervals in the tire circumferential direction. A lug groove 72 is formed on an extension line of the lug groove 70 on outer side in the tire width direction and communicates with the circumferential subsidiary groove 20.

As illustrated in FIG. 1, the end portion of the lug groove 72 on outer side in the tire width direction communicates with the circumferential subsidiary groove 20 in the land portion L32. However, in the land portions L31 and L33 adjacent in the tire circumferential direction to the land portion L32, the end portion of the lug groove 72 on outer side in the tire width direction terminates within the land portion without communicating with the circumferential subsidiary groove 20. Moreover, the land portions L31 and L33 in which the lug groove 72 does not communicate with the circumferential subsidiary groove 20 are defined and formed by two lug grooves 64 and 64 which communicate with each other through the circumferential subsidiary groove 20. Note that land portions constituting the land portion row L3 other than the land portions L31 to L33 described above have a configuration in which land portions similar to the land portions L31 and L32 are alternately disposed in the tire circumferential direction.

The land portion L42 is defined and formed by providing a lug groove 82 which extends from the circumferential main groove 18 in a substantially tire width direction, a lug groove 84 which extends from the circumferential subsidiary groove 20 in a substantially tire width direction, and a main sipe 86 which bridges between the lug grooves 82 and 84, at equal intervals in the tire circumferential direction. A branch sipe 88 extends from the main sipe 86 on one side in the tire circumferential direction and terminates within the land portion L42.

Moreover, a lug groove 90 which extends from the circumferential main groove 18 in a substantially tire width direction and terminates within the land portion L42 is provided between the lug grooves 82 and 82 at regular intervals in the tire circumferential direction. A lug groove 92 is formed on an extension line of the lug groove 90 on outer side in the tire width direction, and the end portion of the lug groove 92 on outer side in the tire width direction terminates within the land portion L42.

As illustrated in FIG. 1, the end portion of the lug groove 92 on outer side in the tire width direction does not communicate with the circumferential subsidiary groove 20 in the land portion L42. However, in the land portions L41 and L43 adjacent in the tire circumferential direction to the land portion L42, the end portion of the lug groove 92 on outer side in the tire width direction communicates with the circumferential subsidiary groove 20. Moreover, the land portions L42 and L44 in which the lug groove 92 does not communicate with the circumferential subsidiary groove 20 are defined and formed by two lug grooves 84 and 84 that communicate with each other through the circumferential subsidiary groove 20. Note that land portions constituting the land portion row L4 other than the land portions L41 to L44 described above have a configuration in which land portions similar to the land portions L41 and L42 are alternately disposed in the tire circumferential direction.

Here, as illustrated in FIG. 1, inclined grooves (for example, the inclined grooves 24) and the main sipe 26 adjacent thereto have an identical groove width on both sides of the boundary between them in FIG. 1. However, main sipes are narrower in width than inclined grooves. This is because each of the main sipes illustrated in FIG. 1 includes a chamfered portion on both outer sides in its width direction. Thus, a width of a main sipe including chamfered portions is identical to a width of an adjacent inclined groove. The same applies to the relationship between other inclined grooves (for example, the inclined groove 44) and the main sipe 46 adjacent thereto as well as the relationship between lug grooves (for example, the lug groove 62) and the main sipe 66 adjacent thereto.

Each of the land portions L11, L12 and L13 constituting the land portion row L1 defined and formed by the circumferential main grooves 14 and 16 includes a dimple group including three dimples 100, 102 and 104 formed in its center portion in the tire circumferential direction. Here, "dimple" refers to a recess portion from a tread surface towards the inner side in the tire radial direction excluding grooves and sipes.

Similarly, each of the land portions L22 and L23 constituting the land portion row L2 defined and formed by the circumferential main grooves 16 and 18 includes a dimple group including three dimples 110, 112 and 114 formed in its central portion in the tire circumferential direction.

On the premise of having the above-mentioned configuration, as illustrated in FIG. 1, the pneumatic tire according to the present embodiment includes dimple groups (hereinafter, each of the dimple groups are referred as a dimple group 11 that is formed in the land portion L11, a dimple group 12 that is formed in the land portion L12, a dimple group 13 that is formed in the land portion L13, a dimple group 21 that is formed in the land portion L21, a dimple group 22 that is formed in the land portion L22, a dimple group 23 that is formed in the land portion L23, and a dimple group 24 that is formed in the land portion L 24), each of which consists of a plurality of dimples (three dimples 100, 102 and 104 for the dimple groups 11 to 13, and three dimples 110, 112 and 114 for the dimple groups 21 to 24) disposed at intervals and aligned in the tire circumferential direction.

When the minimum center-to-center distance between different dimples in an identical dimple group (a center-to-center distance between the dimples 100 and 102 illustrated in FIG. 1) is defined as K, and the minimum center-to-center distance between dimples in different dimple groups (for example, the dimple groups 12 and 13) is defined as L (see FIG. 1), the ratio L/K is 3.5 or more and 10.0 or less and the minimum center-to-center distance L is 20 mm or more and equal to or less than a ground contact length. Here, a center of a dimple refers to a center of the circumscribing circle of the dimple. A ground contact length refers to a dimension between ground contact edges in the tire width direction in a state where the tire is mounted on a specified rim, inflated to a specified internal pressure and loaded with 70% of the maximum load capacity.

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Furthermore, "maximum load capacity" refers to the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO.

Effects

In the present embodiment, by composing a dimple group of a plurality of dimples disposed at intervals and aligned in the tire circumferential direction, drainage performance can be enhanced and ground contact pressure can be moderately increased compared to a case where no dimple group is provided (Effect 1).

Moreover, in the present embodiment, by setting the ratio L/K to 3.5 or more, the minimum center-to-center distance L between dimples in different dimple groups located in an identical land portion row can be sufficiently ensured, and the rigidity of land portions can be increased. Note that, practically, as illustrated in FIG. 1, an inclined groove (for example, the inclined groove 24 or 44) is located between different dimple groups. And thus, setting the ratio L/K to 3.5 or more is intended to spread different dimple groups and inclined grooves located between them in the tire circumferential direction appropriately in the tire circumferential direction (Effect 2).

In contrast, by setting the ratio L/K to 10.0 or less, in particular drainage performance can be enhanced without excessively increasing the minimum center-to-center distance L between dimples in different dimple groups located in an identical land portion row. Note that, practically, as illustrated in FIG. 1, an inclined groove (for example, the inclined groove 24 or 44) is located between different dimple groups. And thus, setting the ratio L/K to 10.0 or less is intended to gather different dimple groups and inclined grooves located between them in the tire circumferential direction appropriately in the tire circumferential direction (Effect 3).

Furthermore, by setting the minimum center-to-center distance L to 20 mm or more, the minimum center-to-center distance L between dimples in different dimple groups located in an identical land portion row can be sufficiently ensured, and the rigidity of land portions can be increased, as is the case with Effect 2 described above (Effect 4).

In contrast, by setting the minimum center-to-center distance L to be equal to or less than a ground contact length, in particular drainage performance can be enhanced without excessively increasing the minimum center-to-center distance L between dimples in different dimple groups located in an identical land portion row, as in the case with Effect 3 described above (Effect 5).

Accordingly, in the pneumatic tire according to the present embodiment, by improving the positional relationship between dimples constituting dimple groups, Effects 1 to 5 described above interact with each other to enhance wet steering stability performance and dry steering stability performance in a well-balanced manner.

In the pneumatic tire according to the present embodiment described above, the main sipe 32 communicates with the inclined grooves 30. However, the present embodiment is not limited thereto and also includes a configuration in which there is no inclined groove 30 and only the main sipe 32 and the branch sipe 34 are present in a land portion without communicating with other grooves. The same applies to the sipe group (main sipe 26, branch sipe 28), the sipe group (main sipe 46, branch sipe 48), the sipe group (main sipe 52, branch sipe 54), the sipe group (main sipe 66, branch sipe 68), and the sipe group (main sipe 86 and branch sipe 88).

Moreover, as illustrated in FIG. 1, the pneumatic tire according to the present embodiment is an example in which three circumferential main grooves are present, but the pneumatic tire according to the present embodiment is not limited thereto and may include three to five circumferential main grooves. The total width of the circumferential main grooves (dimension in a direction perpendicular to an extension direction of the grooves) can be 10 to 35% of a ground contact width in a state where a load of 70% of the maximum load capacity is applied. Moreover, the depth of the circumferential main groove (a maximum dimension measured in the tire radial direction from a tire surface on the assumption that the groove is not present) can be 4.5 mm to 11.0 mm. The number of the circumferential main grooves, the total width of the circumferential main grooves, and the depth of the circumferential main groove are set in consideration of the rigidity and the drainage performance of land portions.

Furthermore, in the pneumatic tire according to the present embodiment, the minimum center-to-center distance K between different dimples in an identical dimple group can be 10 mm or less in consideration for increasing a ground contact pressure. The number of dimples constituting one dimple group can be three or more and six or less in consideration of the ground contact pressure and the rigidity of land portions.

In addition, the diameter of a dimple (the diameter of the circumscribing circle thereof) can be 2.0 mm or more and 6.0 mm or less and the depth of the dimple can be 0.5 mm or more and 3.0 mm or less. Furthermore, the dimple can have any shape such as an n-sided polygon (n is an integer of 3 or more), a circle, an ellipse, a star, or a drop shape in a plan view of a tire.

Although not entirely illustrated, the pneumatic tire according to the present embodiment described above has the same meridian cross-sectional shape as a conventional pneumatic tire. That is, in a meridian cross-sectional view, the pneumatic tire according to the present embodiment includes bead portions, sidewall portions, shoulder portions, and the tread portion in that order from the inner side to the outer side in the tire radial direction. For example, in a meridian cross-sectional view, the pneumatic tire includes a carcass layer that extends from the tread portion to the bead portions on both sides and is wound around a pair of bead cores and the above-described belt layer and a belt cover layer on the outer side in the tire radial direction of the carcass layer.

The pneumatic tire according to the present embodiment is obtained through various general manufacturing processes, in other words, a step of mixing tire materials, a step of processing the tire materials, a step of molding a green tire, a vulcanization step, an inspection step after vulcanization, and the like. When manufacturing the pneumatic tire according to the present embodiment, for example, recess portions and protrusion portions corresponding to the tread pattern illustrated in FIG. 1 are formed in the inner wall of a vulcanization mold, and vulcanization is performed by using this mold.

Additional Embodiments

Next, Additional Embodiments 1 to 15 that can optionally be implemented on the above-described Basic Embodiment of the pneumatic tire according to an embodiment of the present technology will be described.

Additional Embodiment 1

Figure 2:
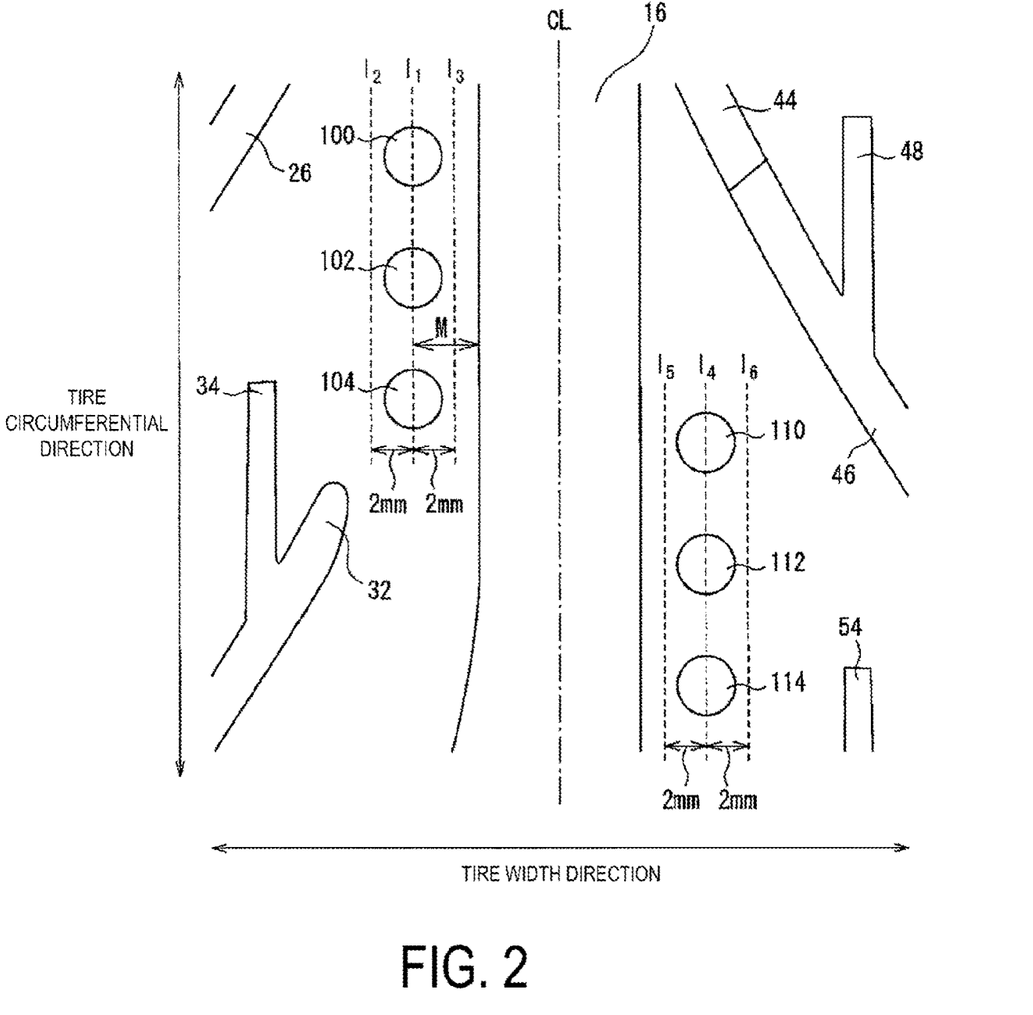
FIG. 2 is an enlarged plan view illustrating dimple groups located on both sides of a circumferential main groove in a tire width direction illustrated in FIG. 1.

FIG. 2 is an enlarged plan view illustrating dimple groups located on both sides of the circumferential main groove 16 in the tire width direction illustrated in FIG. 1. In Basic Embodiment, as illustrated in FIG. 2, for dimples 100 and 104 that are two dimples which have the largest center-to-center distance in the tire circumferential direction in an identical dimple group (for example, a dimple group 1 composed of dimples 100, 102 and 104 illustrated in FIG. 1), an absolute value of an angle of a reference line $l_1$ connecting centers of the dimples 100 and 104 with respect to the tire circumferential direction is preferably 15° or less, and the shortest distance M between the reference line $l_1$ and an edge line of an adjacent groove (the circumferential main groove 16 in FIG. 1) closest to the dimple group (for example, the dimple group 1 in FIG. 1), is preferably 1.5 mm or more and 10.0 mm or less (Additional Embodiment 1).

It is known that a plurality of dimples (dimple groups) provides drainage performance close to but less than grooves formed by connecting dimples, and that drainage performance can be achieved more easily in a so-called center region including a tire equatorial plane CL than in so-called shoulder regions including ground contact edges, and that forming grooves in the tire circumferential direction as far as possible is advantageous for enhancement of drainage performance. In view of these findings, by forming dimple groups in the vicinity of the tire equatorial plane CL, and by setting the extension direction of the dimple groups substantially in the tire circumferential direction (by setting the absolute value of the angle of the reference line $l_1$ with respect to the tire circumferential direction to 15° or less), drainage performance can be further enhanced, and thus wet steering stability performance can be further enhanced. Note that, when the absolute value of the angle of the reference line $l_1$ with respect to the tire circumferential direction is 10° or less, the above effects can be achieved at a higher level, and when the absolute value is 5° or less, the above effects can be achieved at an extremely high level.

In addition, by setting the shortest distance M described above to 1.5 mm or more, the rigidity of land portions between the dimples and the adjacent groove described above can be further increased and wet steering stability performance and dry steering stability performance can be further enhanced. On the other hand, by setting the shortest distance M to 10.0 mm or less, drainage performance can be further enhanced, and in particular wet steering stability performance can be further enhanced.

Additional Embodiment 2

In Basic Embodiment or an embodiment in which Additional Embodiment 1 is added to Basic Embodiment, as illustrated in FIG. 2, an adjacent groove is preferably a circumferential main groove (for example, the circumferential main groove 16 illustrated in FIG. 2) (Additional Embodiment 2).

Referring to FIG. 2, for example, the main sipe 26 and the circumferential main groove 16 are present in the vicinity of the dimple 100, and the circumferential main groove 16 is located more closely to the dimple 100. Similarly, in FIG. 2, the main sipes 26 and 32, the branch sipe 34 and the circumferential main groove 16 are present in the vicinity of the dimples 102, and the circumferential main groove 16 is located most closely to the dimples 102. Moreover, in FIG. 2, the main sipe 32, the branch sipe 34 and the circumferential main groove 16 are present in the vicinity of the dimple 104, and the circumferential main groove 16 is located most closely to the dimples 104.

As described above, because the circumferential main groove 16 having the largest capacity is located most closely to each of the dimples 100 to 104, a drainage passage from these dimples to the circumferential main groove is preferentially formed and a considerable drainage volume is ensured, and thus wet steering stability performance can be further enhanced. Note that, the above-described phenomenon is applicable not only to the dimple group 1 described above, but also to a dimple group 2.

Additional Embodiment 3

In an embodiment in which Additional Embodiment 2 is added to Basic Embodiment, an adjacent groove is preferably formed in a region of 40% of the ground contact width centered on the tire equatorial plane CL (Additional Embodiment 3).

Better drainage performance can be easily achieved when grooves are formed as closely as possible to the tire equatorial plane CL. Thus, by forming the adjacent groove in the region of 40% of the ground contact width centered on the tire equatorial plane CL, drainage performance can be further enhanced. As a result, in particular wet steering stability performance can be further enhanced.

Additional Embodiment 4

In Basic Embodiment or an embodiment in which at least any one of Additional Embodiments 1 to 3 is added to Basic Embodiment, preferably, as illustrated in FIG. 2, at least one dimple group in which the centers of all dimples in the identical dimple group are located within a range bounded by two parallel lines $l_2$ and $l_3$ each of which is parallel to a reference line $l_1$ and is located at a distance of 2 mm from the reference line $l_1$, the reference line connecting the centers of two dimples in the identical dimple group which have the largest center-to-center distance in the tire circumferential direction (Additional Embodiment 4).

By including at least one dimple group in which the centers of all dimples in the identical dimple group are located within the range bounded by the parallel lines $l_2$ and $l_3$, substantially all the dimples in the dimple group are formed near an adjacent groove. As a result, drainage performance can be further enhanced, and in particular wet steering stability performance can be further enhanced.

Additional Embodiment 5

In Basic Embodiment or an embodiment in which at least any one of Additional Embodiments 1 to 4 is added to Basic Embodiment, as illustrated in FIG. 2, in every region bounded by two circumferential main grooves (that is, in every land portion row), centers of all dimples are preferably located within a range bounded by two parallel lines $l_2$ and $l_3$ (two parallel lines $l_5$ and $l_6$) each of which is parallel to a reference line $l_1$ (a reference line $l_4$) and is located at a distance of 2 mm from the reference line $l_1$ (the reference line $l_4$), the reference line connecting the centers of two dimples which have the largest center-to-center distance in the tire circumferential direction in the identical dimple group (Additional Embodiment 5).

By disposing the centers of all dimples within the range bounded by two parallel lines $l_2$ and $l_3$ (two parallel lines $l_5$ and $l_6$) each of which is parallel to the reference line $l_1$ (the reference line $l_4$) and is located at a distance of 2 mm from the reference line $l_1$ (the reference line $l_4$) in every land portion row, substantially all dimples are formed near adjacent grooves. As a result, drainage performance can be further enhanced, and in particular wet steering stability performance can be further enhanced.

Additional Embodiment 6

In Basic Embodiment or an embodiment in which at least any one of Additional Embodiments 1 to 5 is added to Basic Embodiment, the diameter of the circumscribing circle of a dimple is preferably 20% or more and 70% or less of the width of an adjacent groove which is a groove closest to a dimple group (Additional Embodiment 6).

By setting the diameter of the circumscribing circle of a dimple to 20% or more of the width of an adjacent groove, drainage performance can be further enhanced, and in particular wet steering stability performance can be further enhanced. In contrast, by setting the diameter of the circumscribing circle of a dimple to 70% or less of the width of an adjacent groove, unreasonable increase in the size of a dimple can be prevented and thus reduction in the rigidity of land portions due to formation of dimples can be suppressed, and consequently wet steering stability performance and dry steering stability performance can be further enhanced. Note that by setting the diameter of the circumscribing circle of a dimple to 25% or more and 55% or less of the width of an adjacent groove, each of the above effects can be achieved at a higher level.

Additional Embodiment 7

In Basic Embodiment or an embodiment in which at least any one of Additional Embodiments 1 to 6 is added to Basic Embodiment, the diameter of the circumscribing circle of a dimple is preferably 2.0 mm or more and 6.0 mm or less (Additional Embodiment 7).

By setting the diameter of the circumscribing circle of a dimple to 2.0 mm or more, drainage performance can be further enhanced, and in particular wet steering stability performance can be further enhanced. In contrast, by setting the diameter of the circumscribing circle of a dimple to 6.0 mm or less, unreasonable increase in the size of a dimple can be prevented and thus reduction in the rigidity of land portions due to formation of dimples can be suppressed, and consequently wet steering stability performance and dry steering stability performance can be further enhanced. Note that by setting the diameter of the circumscribing circle of a dimple to 2.3 mm or more and 5.5 mm or less, each of the above effects can be achieved at a higher level, and by setting the diameter to 2.5 mm or more and 4.5 mm or less, each of the above effects can be achieved at an extremely high level.

Additional Embodiment 8

In Basic Embodiment or an embodiment in which at least any one of Additional Embodiments 1 to 7 is added to Basic Embodiment, a depth of a dimple (a maximum dimension measured in the tire radial direction from a tire surface on the assumption that the dimple is not present) is preferably 5% or more and 40% or less of a depth of an adjacent groove (a maximum dimension measured in the tire radial direction from a tire surface on the assumption that the groove is not present) which is a groove closest to a dimple group (Additional Embodiment 8).

By setting the depth of a dimple to 5% or more of the depth of an adjacent groove, drainage performance can be further enhanced, and in particular wet steering stability performance can be further enhanced. In contrast, by setting the depth of a dimple to 40% or less of the depth of an adjacent groove, unreasonable increase in the size of a dimple can be prevented and thus reduction in the rigidity of land portions due to formation of dimples can be suppressed, and consequently wet steering stability performance and dry steering stability performance can be further enhanced. Note that by setting the depth of a dimple to 10% or more and 30% or less of the depth of an adjacent groove, each of the above effects can be achieved at a higher level.

Additional Embodiment 9

In Basic Embodiment or an embodiment in which at least any one of Additional Embodiments 1 to 8 is added to Basic Embodiment, a depth of a dimple is preferably 0.5 mm or more and 3.0 mm or less (Additional Embodiment 9).

By setting the depth of a dimple to 0.5 mm or more, drainage performance can be further enhanced, and in particular wet steering stability performance can be further enhanced. In contrast, by setting the depth of a dimple to 3.0 mm or less, unreasonable increase in the size of a dimple can be prevented and thus reduction in the rigidity of land portions due to formation of dimples can be suppressed, and consequently wet steering stability performance and dry steering stability performance can be further enhanced. Note that by setting the depth of a dimple to 2.0 mm or less, reduction in the rigidity of land portions can be suppressed at a higher level.

Additional Embodiment 10

In Basic Embodiment or an embodiment in which at least any one of Additional Embodiments 1 to 9 is added to Basic Embodiment, in every region sandwiched between two circumferential main grooves, a ratio of an area of dimples in the region to an area of the region is preferably 10% or less (Additional Embodiment 10). Here, "region sandwiched between two circumferential main grooves" refers to an entire region including land portions, dimples and recess portions other than dimples (various grooves and sipes).

By setting the ratio of the area of dimples to 10% or less in every region sandwiched between two circumferential main grooves, unreasonable increase of a region of a dimple can be prevented and thus reduction in the rigidity of land portions due to formation of dimples can be suppressed, and consequently wet steering stability performance and dry steering stability performance can be further enhanced. Note that in order to achieve both drainage performance and the rigidity of land portions at a higher level, the ratio of the area of dimples is more preferably 1% or more and 8% or less in every region sandwiched between two circumferential main grooves.

Additional Embodiment 11

In Basic Embodiment or an embodiment in which at least any one of Additional Embodiments 1 to 10 is added to Basic Embodiment, preferably, a vehicle mounting direction is designated, and a phase of a dimple group on a vehicle mounting inner side in the tire circumferential direction differs from a phase of a dimple group on a vehicle mounting outer side in the tire circumferential direction (Additional Embodiment 11).

On the premise of a tire with a designated vehicle mounting direction, by differentiating the phase of the dimple group on a vehicle mounting inner side in the tire circumferential direction from the phase of the dimple group on a vehicle mounting outer side in the tire circumferential direction, local reduction in the rigidity of land portions can be suppressed in every ground contact surface and dry steering stability performance can be further enhanced. In addition, with the configuration described above, extreme changes in road noise depending on a ground contact surface can be suppressed without significantly changing the ratio of grooves, sipes and dimples, that is, a void ratio in every ground contact surface, and thus noise-related performance can be enhanced.

In FIG. 1, for example, by setting the side of the circumferential main groove 14 with respect to the tire equatorial plane CL as a vehicle mounting outer side and the side of the circumferential main groove 18 as a vehicle mounting inner side, and by differentiating the phase of a dimple group 1 formed in the land portion row L1 from the phase of a dimple group 2 formed in the land portion row L2 in the tire circumferential direction, the above effects can be achieved.

Additional Embodiment 12

Figure 3:
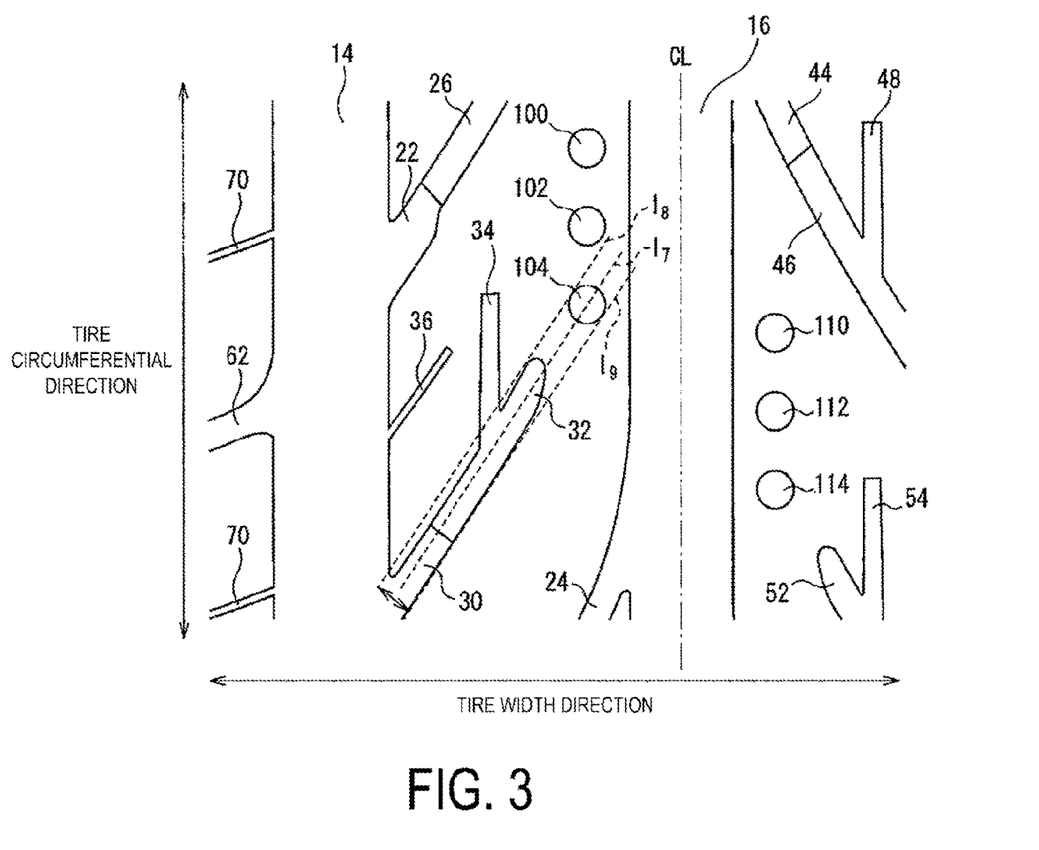
FIG. 3 is a plan view illustrating the positional relationship among inclined grooves, main sipes and dimples.

FIG. 3 is a plan view illustrating the positional relationship among the inclined grooves, the main sipe 32 and the dimple 104. In Basic Embodiment or an embodiment in which at least any one of Additional Embodiments 1 to 11 is added to Basic Embodiment, as illustrated in FIG. 3, preferably, in at least any one of regions bounded by two circumferential main grooves (for example, the region bounded by the circumferential main grooves 14 and 16), an inclined groove 30 including one end that communicates with either of the circumferential main grooves (the circumferential main groove 14 in FIG. 3) and another end that terminates within a land portion or communicates with the main sipe 32 as illustrated in FIG. 3 is formed, and a center (center of the circumscribing circle) of any one of the dimples in the dimple group 1 (the dimple 104 in FIG. 3) is located within a range bounded by two parallel lines $l_8$ and $l_9$ of the inclined groove each of which is parallel to a reference line $l_7$ of the inclined groove illustrated in FIG. 3 and is located at a distance of 3 mm from the reference line $l_7$ (Additional Embodiment 12). Here, "reference line of an inclined groove" refers to a line which connects the center points in a width direction at both ends of an inclined groove in the extension direction thereof in a case where there is no main sipe. On the other hand, as illustrated in FIG. 3, when the main sipe 32 is present, it refers to a line which connects the center points in a width direction at both ends of a recess portion consisting of the inclined groove 30 and the main sipe 32. Note that, as illustrated in FIG. 3, in a case where the main sipe 32 is tapered, one end is taken at the position immediately before tapering.

By disposing the center of any one of the dimples in the dimple group 1 within the range bounded by the parallel lines $l_8$ and $l_9$ of the inclined groove, as illustrated in FIG. 1 for example, a drainage passage in which water moves through the inclined groove 30, the main sipe 32, the dimple 104 and the circumferential main groove 16 in this order is formed. As a result, drainage performance can be further enhanced, and thus wet steering stability performance can be further enhanced.

Note that although the inclined groove 30 has a straight shape in FIG. 1, it may have a curved shape. In a case where an inclined groove (when a main sipe is present, a recess portion consisting of the inclined groove and the main sipe) has a curved shape, a line connecting the center positions in a width direction at both ends of the inclined groove (the recess portion) in the extension direction thereof is defined as the reference line of the inclined groove $l_7$. Note that although the main sipe 32 is formed on inner side in the tire width direction of the inclined groove 30 in the example illustrated in FIG. 1, the present embodiment is not limited thereto as described above. That is, the present embodiment includes a configuration including no main sipe.

Additional Embodiment 13

In an embodiment in which Additional Embodiment 12 is added to Basic Embodiment, as illustrated in FIG. 3, the center of a dimple on a ground contact trailing edge in the dimple group is preferably located within a range bounded by two parallel lines $l_8$ and $l_9$ of the inclined groove (Additional Embodiment 13). In the present embodiment, the dimple 104 illustrated in FIG. 3 is assumed to be a dimple on the ground contact trailing edge. In other words, in FIG. 3, the top side of the drawing indicates a leading side and the bottom side indicates a trailing side.

As illustrated in FIG. 3, by disposing the center of the dimple 104, which is a dimple on the ground contact trailing edge in the dimple group, within the range bounded by the parallel lines $l_8$ and $l_9$ of the inclined groove, a drainage passage in which water moves through the dimple 100, the dimple 102, the dimple 104, the main sipe 32, the inclined groove 30 and the circumferential main groove 14 in this order is formed. As a result, drainage performance can be further enhanced, and thus wet steering stability performance can be further enhanced.

Additional Embodiment 14

Figure 4:
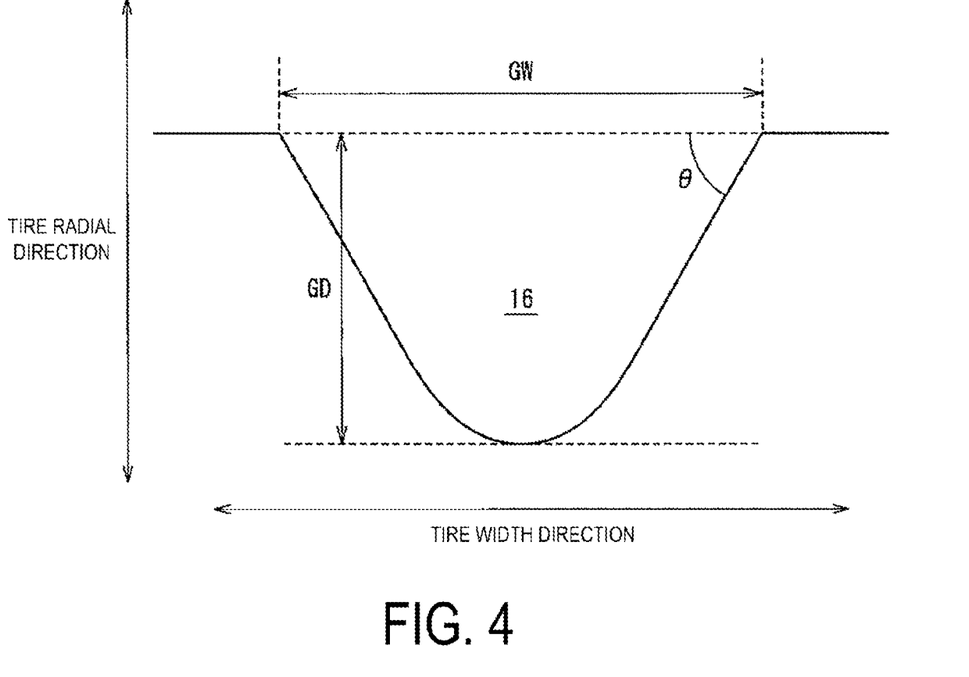
FIG. 4 is a cross-sectional view along the line A-A' illustrated in FIG. 1.

FIG. 4 is a cross-sectional view along the line A-A' illustrated in FIG. 1, illustrating an enlarged view of a tire meridian cross-section of the circumferential main groove 16 as an adjacent groove. In Basic Embodiment or an embodiment in which at least any one of Additional Embodiments 1 to 13 is added to Basic Embodiment, when a width of an adjacent groove which is a groove closest to a dimple group is GW, a depth thereof is GD and a groove wall angle thereof is θ, θ is preferably Arctan[GD/(GW/2)] or more and Arctan[GD/(GW/2)]×1.3 or less (Additional Embodiment 14).

By setting θ to Arctan[GD/(GW/2)] or more, the profile line of the adjacent groove 16 illustrated in FIG. 4 is not overly V-shaped, and the occurrence of cracks at and in the vicinity of the bottom of the adjacent groove 16 can be reduced especially in a loaded condition. On the other hand, by setting θ to Arctan[GD/(GW/2)]×1.3 or less, the profile line of the adjacent groove 16 illustrated in FIG. 4 is not overly U-shaped, in other words, excessive reduction in the size of the land portions on both sides of the adjacent groove 16 in the tire width direction can be prevented. As a result, the rigidity of land portions can be increased, and thus wet steering stability performance and dry steering stability performance can be further enhanced.

Note that when θ is Arctan[GD/(GW/2)]×1.1 or more and Arctan[GD/(GW/2)]×1.2 or less, each of the above effects can be achieved at a higher level.

Additional Embodiment 15

In Basic Embodiment or an embodiment in which at least any one of Additional Embodiments 1 to 14 is added to Basic Embodiment, as illustrated in FIGS. 1 to 3, preferably, an inclined groove including one end that communicates with either of the circumferential main grooves and another end that terminates within a land portion or communicates with a main sipe is formed, and for example, the main sipe 32 communicating with the inclined groove 30 and the branch sipe 34 branching from the main sipe 32 are provided (Additional Embodiment 15).

As illustrated in FIGS. 1 and 3, by providing the branch sipe 34, a drainage passage in which water moves through the branch sipe 34, the main sipe 32, the inclined groove 30 and the circumferential main groove 14 in this order is formed. Consequently, drainage performance can be further enhanced, and thus wet steering stability performance can be further enhanced.

Note that a branch sipe may be branched from a main sipe, or may be branched directly from an inclined groove when there is no main sipe. In this case, a drainage passage in which water moves through the branch sipe 34, the inclined groove 30 and the circumferential main groove 14 in this order is formed.

Besides, in consideration of drainage performance and the rigidity of land portions, the width of a branch sipe can be 0.5 mm or more and 3.0 mm or less, and the depth of a branch sipe can be 0.8 mm or more and 2.5 mm or less.

EXAMPLES

Pneumatic tires according to Examples 1 to 16 and Conventional Example having a tire size of 205/55R16 (specified by JATMA) and having the shapes illustrated in FIGS. 1 to 4 are manufactured. Note that the detailed conditions of these pneumatic tires are as shown in Tables 1 to 4 below. In Tables 1 to 4, "K" indicates the minimum center-to-center distance between the centers of different dimples in an identical dimple group; "L" indicates the minimum center-to-center distance between dimples in different dimple groups; "Angle of reference line" refers to the absolute value of the angle of a reference line with respect to the tire circumferential direction, the reference line connecting the centers of two dimples in an identical dimple group which have the largest center-to-center distance in the tire circumferential direction; "M" indicates the shortest distance between the reference line and an edge line of an adjacent groove which is a groove closest to the dimple group; "Region of adjacent groove" refers to a region in which the adjacent groove is formed and which constitutes a specific % of a ground contact width centered on a tire equatorial plane CL; "Conditions for range where centers of all dimples in identical dimple group are present" means whether or not at least one dimple group, in which the centers of all dimples in the identical dimple group are located within a range bounded by two parallel lines parallel to the reference line and located at a distance of 2 mm from the reference line, is included; "Conditions for range where centers of all dimples in all dimple groups are present" means whether or not the centers of all dimples are present within a range bounded by two parallel lines parallel to the reference line and located at a distance of 2 mm from the reference line in every land portion row; "CL" indicates the tire equatorial plane; "Center of dimple present within predetermined range?" means whether or not the center of any one dimple in a dimple group is located within a range bounded by two parallel lines of an inclined groove satisfying predetermined conditions on both sides of CL; "GW" indicates the width of the adjacent groove; "GD" indicates the depth of the adjacent groove; and "θ" indicates the groove wall angle of the adjacent groove. These reference signs and the like are in accordance with the descriptions described above in the present specification. In addition, when a vehicle mounting direction is designated, the phase of dimple groups on a vehicle mounting inner side in the tire circumferential direction differs from the phase of dimple groups on a vehicle mounting outer side in the tire circumferential direction.

The pneumatic tires according to Examples 1 to 16 and the pneumatic tire according to Conventional Example manufactured in this manner were evaluated for wet steering stability performance and dry steering stability performance in accordance with the following procedures. Note that all performance evaluations are conducted on test tires mounted on rims having a size of 16×6.5 J, inflated to an air pressure of 230 kPa, and mounted on a test vehicle having an engine displacement of 2000 cc.

Wet Steering Stability Performance

The test vehicle was driven on a test course of a wet road surface, a feeling evaluation test on steering stability performance was conducted by a test driver, and the results are expressed as index values and evaluated with Conventional Example being assigned as an index value of 100 (reference). The results are shown in Tables 1 to 4. Note that larger values indicate better wet steering stability performance.

Dry Steering Stability Performance

The test vehicle was driven on a test course of a dry road surface, a feeling evaluation test on steering stability performance was conducted by a test driver, and the results are expressed as index values and evaluated with Conventional Example being assigned as an index value of 100 (reference). The results are shown in Tables 1 to 4. Note that larger values indicate better dry steering stability performance.

TABLE 1

|  | Conventional Example | Example 1 | Example 2 | Example 3 | Example 4 |
|---|---|---|---|---|---|
| Ratio L/K | 2.0 | 7.0 | 7.0 | 7.0 | 7.0 |
| L (mm) | 2.0 | 50.0 | 50.0 | 50.0 | 50.0 |
| Angle of reference line (°) | 90 | 90 | 0 | 0 | 0 |
| Shortest distance M (mm) | 12 | 12 | 5 | 5 | 5 |
| Adjacent groove | Inclined groove | Inclined groove | Inclined groove | Circumferential main groove | Circumferential main groove |
| Region of adjacent Groove (%) | 50 | 50 | 50 | 50 | 20 |
| Conditions for range where centers of all dimples in identical dimple group are present | Not included | Not included | Not included | Not included | Not included |
| Conditions for range where centers of all dimples in all dimple groups are present | Not present | Not present | Not present | Not present | Not present |
| Ratio of diameter of circumscribing circle of dimple to width of adjacent groove (%) | 10 | 10 | 10 | 10 | 10 |
| Diameter of circumscribing circle of dimple (mm) | 1.5 | 1.5 | 1.5 | 1.5 | 1.5 |
| Ratio of depth of dimple to depth of adjacent groove (%) | 96 | 96 | 96 | 96 | 96 |
| Depth of dimple (mm) | 5.0 | 5.0 | 5.0 | 5.0 | 5.0 |
| Ratio of area of dimples is 10% or less in both regions sandwiching CL | Not satisfied | Not satisfied | Not satisfied | Not satisfied | Not satisfied |
| Designation of vehicle mounting direction (phase shift) | No | No | No | No | No |
| Center of dimple present within predetermined range? | Not present | Not present | Not present | Not present | Not present |
| Center of dimple on ground contact trailing edge in dimple group present within predetermined range? | Not present | Not present | Not present | Not present | Not present |
| θ/Arctan GD/(GW/2) | 0.9 | 0.9 | 0.9 | 0.9 | 0.9 |
| Presence of branch sipe | No | No | No | No | No |
| Wet steering stability performance | 100 | 100 | 102 | 103 | 105 |
| Dry steering stability performance | 100 | 103 | 103 | 103 | 103 |

TABLE 2

|  | Conventional Example | Example 5 | Example 6 | Example 7 | Example 8 |
| --- | --- | --- | --- | --- | --- |
| Ratio L/K | 2.0 | 2.0 | 7.0 | 7.0 | 7.0 |
| L (mm) | 2.0 | 50.0 | 50.0 | 50.0 | 50.0 |
| Angle of reference line (°) | 90 | 0 | 0 | 0 | 0 |
| Shortest distance M (mm) | 12 | 5 | 5 | 5 | 5 |
| Adjacent groove | Main sipe | Circumferential main groove | Circumferential main groove | Circumferential main groove | Circumferential main groove |
| Region of adjacent Groove (%) | 50 | 20 | 20 | 20 | 20 |
| Conditions for range where centers of all dimples in identical dimple group are present | Not included | Included | Included | Included | Included |
| Conditions for range where centers of all dimples in all dimple groups are present | Not present | Not present | Present | Present | Present |
| Ratio of diameter of circumscribing circle of dimple to width of adjacent groove (%) | 10 | 10 | 10 | 40 | 40 |
| Diameter of circumscribing circle of dimple (mm) | 1.5 | 1.5 | 1.5 | 1.5 | 3.5 |
| Ratio of depth of dimple to depth of adjacent groove (%) | 96 | 96 | 96 | 96 | 96 |
| Depth of dimple (mm) | 5.0 | 5.0 | 5.0 | 5.0 | 5.0 |
| Ratio of area of dimples is 10% or less in both regions sandwiching CL | Not satisfied | Not satisfied | Not satisfied | Not satisfied | Not satisfied |
| Designation of vehicle mounting direction (phase shift) | No | No | No | No | No |
| Center of dimple present within predetermined range? | Not present | Not present | Not present | Not present | Not present |
| Center of dimple on ground contact trailing edge in dimple group present within predetermined range? | Not present | Not present | Not present | Not present | Not present |
| θ/Arctan GD/(GW/2) | 0.9 | 0.9 | 0.9 | 0.9 | 0.9 |
| Presence of branch sipe | No | No | No | No | No |
| Wet steering stability performance | 100 | 106 | 107 | 109 | 110 |
| Dry steering stability performance | 100 | 103 | 103 | 102 | 102 |

TABLE 3

| | Conventional Example | Example 9 | Example 10 | Example 11 | Example 12 |
|---|---|---|---|---|---|
| Ratio L/K | 2.0 | 7.0 | 7.0 | 7.0 | 7.0 |
| L (mm) | 2.0 | 50.0 | 50.0 | 50.0 | 50.0 |
| Angle of reference line (°) | 90 | 0 | 0 | 0 | 0 |
| Shortest distance M (mm) | 12 | 12 | 12 | 12 | 5 |
| Adjacent groove | Main sipe | Circumferential main groove | Circumferential main groove | Circumferential main groove | Circumferential main groove |
| Region of adjacent Groove (%) | 50 | 20 | 20 | 20 | 20 |
| Conditions for range where centers of all dimples in identical dimple group are present | Not included | Included | Included | Included | Included |
| Conditions for range where centers of all dimples in all dimple groups are present | Not present | Present | Present | Present | Present |
| Ratio of diameter of circumscribing circle of dimple to width of adjacent groove (%) | 10 | 40 | 40 | 40 | 40 |
| Diameter of circumscribing circle of dimple (mm) | 1.5 | 3.5 | 3.5 | 3.5 | 3.5 |
| Ratio of depth of dimple to depth of adjacent groove (%) | 96 | 13 | 13 | 13 | 13 |
| Depth of dimple (mm) | 3.5 | 3.5 | 0.7 | 0.7 | 0.7 |
| Ratio of area of dimples is 10% or less in both regions sandwiching CL | Not satisfied | Not satisfied | Not satisfied | Satisfied | Satisfied |
| Designation of vehicle mounting direction (phase shift) | No | No | No | No | Yes |
| Center of dimple present within predetermined range? | Not present | Not present | Not present | Not present | Not present |
| Center of dimple on ground contact trailing edge in dimple group present within predetermined range? | Not present | Not present | Not present | Not present | Not present |
| θ/Arctan GD/(GW/2) | 0.9 | 0.9 | 0.9 | 0.9 | 0.9 |
| Presence of branch sipe | No | No | No | No | No |
| Wet steering stability performance | 100 | 109 | 109 | 108 | 108 |
| Dry steering stability performance | 100 | 104 | 105 | 107 | 109 |

TABLE 4

| | Conventional Example | Example 13 | Example 14 | Example 15 | Example 16 |
|---|---|---|---|---|---|
| Ratio L/K | 2.0 | 7.0 | 7.0 | 7.0 | 7.0 |
| L (mm) | 2.0 | 50.0 | 50.0 | 50.0 | 50.0 |
| Angle of reference line (°) | 90 | 0 | 0 | 0 | 0 |
| Shortest distance M (mm) | 12 | 5 | 5 | 5 | 5 |
| Adjacent groove | Main sipe | Circumferential main groove | Circumferential main groove | Circumferential main groove | Circumferential main groove |
| Region of adjacent Groove (%) | 5 | 20 | 20 | 20 | 20 |
| Conditions for range where centers of all dimples in identical dimple group are present | Not included | Included | Included | Included | Included |

TABLE 4-continued

|  | Conventional Example | Example 13 | Example 14 | Example 15 | Example 16 |
|---|---|---|---|---|---|
| Conditions for range where centers of all dimples in all dimple groups are present | Not present | Present | Present | Present | Present |
| Ratio of diameter of circumscribing circle of dimple to width of adjacent groove (%) | 10 | 40 | 40 | 40 | 40 |
| Diameter of circumscribing circle of dimple (mm) | 1.5 | 3.5 | 3.5 | 3.5 | 3.5 |
| Ratio of depth of dimple to depth of adjacent groove (%) | 96 | 13 | 13 | 13 | 13 |
| Depth of dimple (mm) | 3.5 | 0.7 | 0.7 | 0.7 | 0.7 |
| Ratio of area of dimples is 10% or less in both regions sandwiching CL | Not satisfied | Satisfied | Satisfied | Satisfied | Satisfied |
| Designation of vehicle mounting direction (phase shift) | No | Yes | Yes | Yes | Yes |
| Center of dimple present within predetermined range? | Not present | Present | Present | Present | Present |
| Center of dimple on ground contact trailing edge in dimple group present within predetermined range? | Not present | Not present | Present | Present | Present |
| θ/Arctan GD/(GW/2) | 0.9 | 0.9 | 0.9 | 1.1 | 1.1 |
| Presence of branch sipe | No | No | No | No | Yes |
| Wet steering stability performance | 100 | 109 | 110 | 110 | 112 |
| Dry steering stability performance | 100 | 109 | 109 | 110 | 110 |

Tables 1 to 4 show that each of the pneumatic tires according to Examples 1 to 16 that comply with the technical scope of the present technology (that is, the pneumatic tires in which the positional relationship between dimples constituting dimple groups is improved) is improved in wet steering stability performance and dry steering stability performance in a well-balanced manner, when compared with the pneumatic tire according to Conventional Example that does not comply with the technical scope of the present technology.

The invention claimed is:

1. A pneumatic tire, comprising:
a plurality of dimple groups formed in a tread surface,
the dimple groups being composed of a plurality of dimples disposed at intervals and aligned in a tire circumferential direction,
a ratio L/K being 3.5 or more and 7.0 or less, and
a minimum center-to-center distance L being 20 mm or more and equal to or less than a ground contact length, where,
K is a minimum center-to-center distance between different dimples in an identical dimple group, and
L is the minimum center-to-center distance between dimples in different dimple groups, wherein
an inclined groove is formed in at least any one of regions bounded by two circumferential main grooves, the inclined groove comprising one end communicating with one of the two circumferential main grooves and another end terminating within a land portion or communicating with a main sipe,
a center of any one of the dimples in the dimple group is located within a range bounded by two parallel lines of the inclined groove that are parallel to a reference line of the inclined groove and located at a distance of 3 mm from the reference line of the inclined groove, and
the reference line of the inclined groove is a line connecting center points in a width direction at both ends of the inclined groove in an extension direction of the inclined groove in a case where the main sipe is not present, or in a case where the main sipe is present, the reference line of the inclined groove is a line connecting center points in a width direction at both ends of a recess portion consisting of the inclined groove and the main sipe.

2. The pneumatic tire according to claim 1, wherein
an absolute value of an angle of a reference line with respect to a tire circumferential direction is 15° or less, the reference line connecting centers of two dimples in an identical dimple group, the two dimples having a largest center-to-center distance in a tire circumferential direction,
a shortest distance M between the reference line and an edge line of an adjacent groove is 1.5 mm or more and 10.0 mm or less, the adjacent groove being a groove closest to the dimple group.

3. The pneumatic tire according to claim 1, wherein an adjacent groove that is a groove closest to the dimple group is a circumferential main groove.

4. The pneumatic tire according to claim 3, wherein the circumferential main groove is formed in a region of 40% of a ground contact width centered on a tire equatorial plane CL.

5. The pneumatic tire according to claim 1, further comprising at least one dimple group, in which centers of all dimples in the identical dimple group are located within a range bounded by two parallel lines parallel to a reference line and located at a distance of 2 mm from the reference line, the reference line connecting centers of two dimples in the identical dimple group, the two dimples having a largest center-to-center distance in the tire circumferential direction.

6. The pneumatic tire according to claim 1, wherein, in every region bounded by two circumferential main grooves, centers of all dimples are located within a range bounded by two parallel lines parallel to a reference line and located at a distance of 2 mm from the reference line, the reference line connecting centers of two dimples in an identical dimple group, the two dimples having a largest center-to-center distance in the tire circumferential direction.

7. The pneumatic tire according to claim 1, wherein a diameter of a circumscribing circle of the dimple is 20% or more and 70% or less of a width of an adjacent groove that is a groove closest to the dimple group.

8. The pneumatic tire according to claim 1, wherein a diameter of a circumscribing circle of the dimple is 2.0 mm or more and 6.0 mm or less.

9. The pneumatic tire according to claim 1, wherein a depth of the dimple is 5% or more and 40% or less of a depth of an adjacent groove that is a groove closest to the dimple group.

10. The pneumatic tire according to claim 1, wherein a depth of the dimple is 0.5 mm or more and 3.0 mm or less.

11. The pneumatic tire according to claim 1, wherein, in every region sandwiched between two circumferential main grooves, a ratio of an area of the dimples in the region to an area of the region is 10% or less.

12. The pneumatic tire according to claim 1, wherein a vehicle mounting direction is designated, and a phase of a dimple group on a vehicle mounting inner side in the tire circumferential direction differs from a phase of a dimple group on a vehicle mounting outer side in the tire circumferential direction.

13. The pneumatic tire according to claim 1, wherein a center of a dimple on a ground contact trailing edge in the dimple group is present in a range bounded by the two parallel lines of the inclined groove.

14. The pneumatic tire according to claim 1, satisfying the following:

$$\mathrm{Arctan}[GD/(GW/2)] \leq \theta \leq \mathrm{Arctan}[GD/(GW/2)] \times 1.3$$

where,
GW is a width of an adjacent groove,
GD is a depth of the adjacent groove, and
$\theta$ is a groove wall angle of the adjacent groove,
the adjacent groove being a groove closest to the dimple group.

15. The pneumatic tire according to claim 1, comprising an inclined groove being formed therein, an inclined groove comprising one end communicating with either of two circumferential main grooves and another end terminating within a land portion or communicating with a main sipe,
the pneumatic tire further comprising:
a main sipe communicating with the inclined groove, and
a branch sipe branching from the main sipe.

* * * * *